(12) United States Patent
Hayasaka

(10) Patent No.: US 10,289,379 B2
(45) Date of Patent: May 14, 2019

(54) AUDIO/VIDEO SIGNAL PROCESSOR

(71) Applicant: TEAC CORPORATION, Tokyo (JP)

(72) Inventor: Kaname Hayasaka, Saitama-ken (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 15/466,076

(22) Filed: Mar. 22, 2017

(65) Prior Publication Data

US 2017/0277511 A1    Sep. 28, 2017

(30) Foreign Application Priority Data

Mar. 24, 2016    (JP) ................................ 2016-059541

(51) Int. Cl.
| | |
|---|---|
| *G06F 3/16* | (2006.01) |
| *G06F 11/00* | (2006.01) |
| *G06F 11/07* | (2006.01) |
| *G06F 11/14* | (2006.01) |
| *G11B 27/031* | (2006.01) |

(52) U.S. Cl.
CPC .............. *G06F 3/165* (2013.01); *G06F 3/162* (2013.01); *G06F 11/004* (2013.01); *G06F 11/0772* (2013.01); *G11B 27/031* (2013.01); *G06F 11/1479* (2013.01)

(58) Field of Classification Search
CPC ...... G06F 3/165; G06F 11/008; G06F 11/004; G06F 11/07036; G06F 11/0772; G06F 11/1479; G06F 11/1482; G06F 11/3612
USPC ....... 700/94; 714/25, 36, 37, 38, 46, 48, 54; 381/77, 79; 715/716
See application file for complete search history.

(56) References Cited

U.S. PATENT DOCUMENTS

| | | | |
|---|---|---|---|
| 5,168,481 A | 12/1992 | Culbertson et al. | |
| 7,277,766 B1 | 10/2007 | Khan et al. | |
| 8,300,836 B2 * | 10/2012 | Pu | G10L 99/00 381/58 |

(Continued)

FOREIGN PATENT DOCUMENTS

| | | |
|---|---|---|
| EP | 1 102 272 A2 | 5/2001 |
| JP | 2005-45738 A | 2/2005 |

(Continued)

OTHER PUBLICATIONS

Serato, "Serato DJ 1.8 Software Manual", Oct. 29, 2015, pp. 11-13, 16-20, 36, and 77-79 (Year: 2015).*

(Continued)

*Primary Examiner* — Jesse A Elbin
(74) *Attorney, Agent, or Firm* — Seed IP Law Group LLP

(57) ABSTRACT

An apparatus is provided in which a user can easily check that an appropriate audio file is assigned. A system includes a PC connected to a communication line, and an audio interface apparatus that has an immediate output switch that outputs, to the PC, a reproduction start instruction signal of an audio file which is assigned in advance in response to a user operation. The PC judges, when an audio file or a video file is assigned by a user operation and in the background, whether or not the assignment is normal, and displays a judgment result in association with a virtual switch displayed on the display corresponding to the immediate output switch. The judgment is also repeatedly executed in the background at a predetermined timing after the assignment, and when the assignment is not normal, this is displayed.

6 Claims, 8 Drawing Sheets

(56) References Cited

U.S. PATENT DOCUMENTS

| | | |
|---|---|---|
| 8,464,045 B2* | 6/2013 | Hendsbee ............ H04L 9/3268 713/156 |
| 2005/0055202 A1 | 3/2005 | Kunito et al. |
| 2008/0109643 A1* | 5/2008 | Nishida ............ H04N 1/32619 712/225 |
| 2009/0019307 A1 | 1/2009 | Kwon |
| 2009/0138109 A1* | 5/2009 | Park ................ G06F 17/30772 700/94 |
| 2009/0171486 A1 | 7/2009 | Lindsay, Jr. |
| 2009/0213938 A1 | 8/2009 | Lee et al. |
| 2011/0249955 A1 | 10/2011 | Ito et al. |
| 2016/0011923 A1 | 1/2016 | Walker et al. |
| 2016/0019877 A1 | 1/2016 | Remignanti |
| 2016/0021164 A1 | 1/2016 | Chakarapani et al. |

FOREIGN PATENT DOCUMENTS

| | | | |
|---|---|---|---|
| JP | 2006-65223 A | 3/2006 | |
| KR | 100546874 B1 * | 1/2006 | ............ H04N 5/92 |
| WO | 2008/035431 A1 | 3/2008 | |

OTHER PUBLICATIONS

British Office Action, dated Sep. 18, 2017, for British Application No. GB1704621.0, 8 pages.
"MP3Test," URL=https://web.archive.org/web/20160220000636/http://www.shivi.de/MP3Test-EN.html, download date Oct. 5, 2017, 3 pages.
"MP3 Scan + Repair App," URL=http://triq.net/mac/mp3-scan-repair, download date Oct. 5, 2017, 4 pages.

\* cited by examiner

AUDIO/VIDEO SIGNAL PROCESSOR

CROSS REFERENCE TO RELATED APPLICATION

The entire disclosure of Japanese Patent Application No. 2016-059541 filed on Mar. 24, 2016, including the specification, claims, drawings, and abstract, is incorporated herein by reference in its entirety.

TECHNICAL FIELD

The present disclosure relates to an audio/video signal processor.

BACKGROUND

In the related art, various sound reproduction apparatuses are proposed.

WO 2008/035431 A discloses a sound reproduction apparatus in which a plurality of sound data and assignment data are stored in a USB memory, and the assignment data and a switch are associated with each other so that sound data corresponding to an operated switch is captured from the USB memory. This reference also discloses that the association operation of the sound data with the plurality of switches displayed on a display is done by a drag-and-drop operation, and assignment data for associating the sound data to the switch are transferred to the USB memory.

JP 2006-065223 A discloses a sound source reproduction apparatus in which each of a plurality of tact switches is correlated to sound source data stored in a memory, and an associated program is executed according to an operated tact switch, to reproduce and output the sound source data.

JP 2005-045738 A discloses a call apparatus using the Internet which enables transmission and reception of BGM and sound effects in addition to the call voice, and describes that a sound volume of the BGM and the sound effects is set adjustable to optimize the sound volume level during synthesis with the call voice and the sound volume level when transmitting a hold sound by a hold button operation.

A technique is proposed in which an audio interface apparatus and a computer are connected, various audio signals are captured from the audio interface and supplied to the computer, and then suitably edited or the like and recorded on the computer or output to the outside via the Internet (Internet live broadcasting).

In such an audio system, desirably, an audio file to be reproduced and output is assigned in advance to a sound reproduction switch provided on the audio interface apparatus (the switch will hereinafter be referred to as an "immediate output" or "PON" switch), and the assigned audio file is desirably immediately reproduced and output upon operation of the immediate output switch. For assigning the audio file to the immediate output switch in advance, for example, a scheme may be considered in which a virtual immediate output switch corresponding to the physical immediate output switch of the audio interface apparatus is displayed on the computer, and the audio file is assigned by dragging and dropping the audio file to the virtual immediate output switch.

However, a problem occurs in that, in principle, even when an inappropriate file (a file other than the audio file) is erroneously assigned to the immediate output switch, it is not possible to notice that the file is inappropriate until the immediate output switch is actually operated. Even when an appropriate file (audio file) is assigned to the immediate output switch, if the data of the file are in an abnormal state such as when the data are damaged, and the audio cannot be reproduced, similar problem would occur.

Such a problem is not limited to a case of the audio file, and a similar problem may be caused when a video file is assigned.

Further, it may be possible that the audio file or the video file is normal when assigned, but the assigned file may be damaged due to various reasons, and the file becomes non-reproducible.

SUMMARY

An advantage of the present disclosure lies in the provision of an apparatus and a program in which a user can easily check that an appropriate audio file or an appropriate video file is assigned to the operation switch such as the immediate output switch.

According to one aspect of the present disclosure, there is provided an audio/video signal processor comprising: a display; and a processor that judges, when an audio file or a video file is assigned to an assignment target displayed on the display in response to a user operation, whether or not the assigned file is normal by reproducing the assigned file in the background with no sound when the assigned file is an audio file and reproducing the assigned file in the background with no sound and no image when the assigned file is a video file, and that displays, on the display, a judgment result in association with the assignment target.

According to another aspect of the present disclosure, the processor again judges, for an audio file or a video file judged as normal and at a predetermined timing, whether or not the file judged as normal is normal by reproducing the file in the background with no sound when the file is an audio file and reproducing the file in the background with no sound and no image when the file is a video file, and displays, on the display, a judgment result in association with the assignment target.

According to another aspect of the present disclosure, there is provided an audio/video signal processor that can be connected to an audio apparatus that has an operation switch that outputs, in response to a user operation, a reproduction start instruction signal of an audio file which is assigned in advance, the audio/video signal processor comprising: a display; and a processor that displays, on the display, a virtual switch corresponding to the operation switch, that judges, when an audio file is assigned to the virtual switch by a user operation, whether or not the assigned audio file is normal by reproducing the audio file in the background with no sound, and that displays, on the display, a judgment result in association with the virtual switch.

According to another aspect of the present disclosure, the processor again judges, for an audio file judged as normal and at a predetermined timing, whether or not the audio file judged as normal is normal by reproducing the audio file in the background with no sound, and displays, on the display, a judgment result in association with the assignment target.

According to another aspect of the present disclosure, there is provided a computer-readable storage medium storing a program which, when executed, causes a computer to execute a process comprising: a step of displaying, on a display, an assignment target in response to a user operation; a step of displaying, in a list and on the display, an audio file or a video file in response to a user operation; a step of judging, when there is an assignment by the user and by a drag-and-drop operation of an audio file or a video file to the assignment target, whether or not the assigned file is normal by reproducing the assigned file in the background with no sound when the assigned file is an audio file and reproducing the assigned file in the background with no sound and no image when the assigned file is a video file; and a step of displaying, on the display, a judgment result in association with the assignment target.

According to another aspect of the present disclosure, the program further causes the computer to repeatedly execute a step of again judging, for an audio file or a video file judged as normal and at a predetermined timing, whether or not the file judged as normal is normal by reproducing the file in the background with no sound when the file is an audio file and reproducing the file in the background with no sound and no image when the file is a video file, and displaying, on the display, a judgment result in association with the assignment target.

According to various aspects of the present disclosure, a user can easily check that an appropriate audio file or an appropriate video file is assigned.

BRIEF DESCRIPTION OF DRAWINGS

Embodiment(s) of the present disclosure will be described by reference to the following figures, wherein.

DESCRIPTION OF EMBODIMENTS

<First Embodiment>
<Structure>

An embodiment of the present disclosure will now be described with reference to the drawings.

Figure 1:
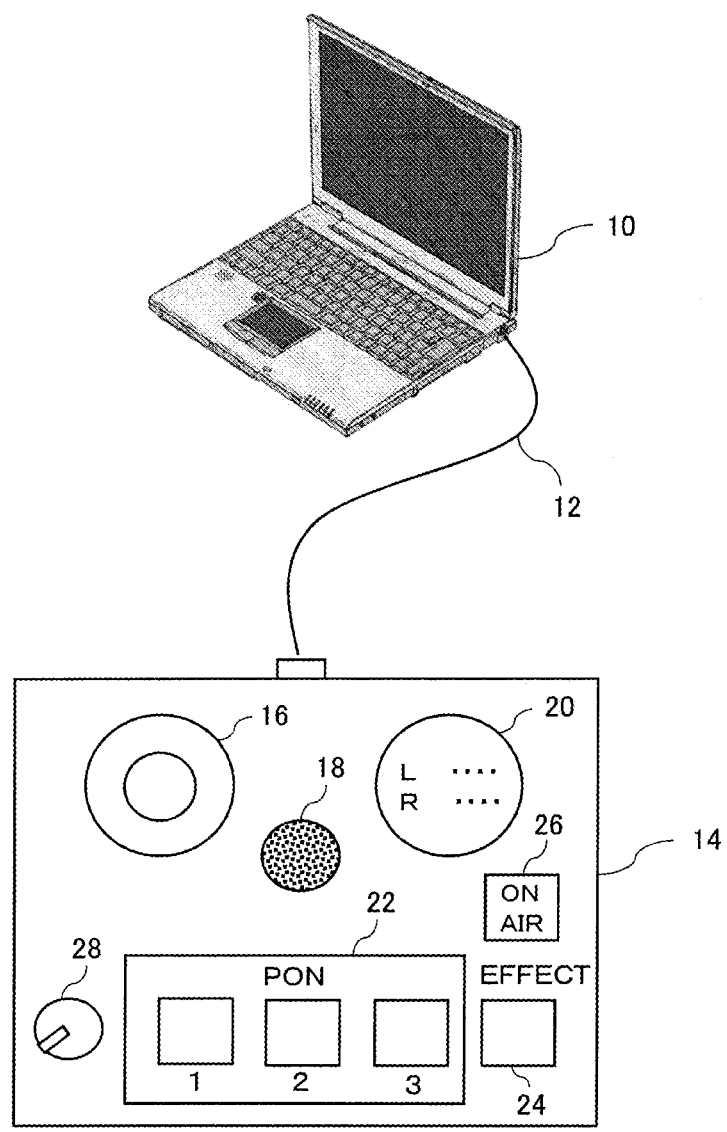
FIG. 1 is a system structural diagram of an embodiment of the present disclosure.

FIG. 1 is a structural diagram of a system of the present embodiment. An audio system according to the present embodiment comprises a personal computer (PC) 10 and an audio interface apparatus 14, and the PC 10 and the audio interface apparatus 14 are connected to each other, for example, by a USB cable 12, in a manner to allow transmission and reception of data.

On the PC 10 serving as an audio/video signal processor, software for inputting, editing, and outputting audio data or video data are installed, and the input/output and editing of the audio data and the video data are executed using the software.

The audio interface apparatus 14 includes an amplifier and an analog input terminal and an analog output terminal of a plurality of channels, and transmits and receives audio signals and various control signals to and from the PC 10. The audio interface apparatus 14 further includes a microphone input terminal 16, a built-in microphone 18, a level meter 20, and a headphone output adjustment button 28, and also includes an immediate output switch 22 including a plurality of buttons, an effect switch 24 for producing various sound effects, and an on-air switch 26.

The immediate output switch 22 includes three immediate output switches, including "immediate output 1," "immediate output 2," and "immediate output 3." When the user operates the immediate output switch 22, the audio interface apparatus 14 supplies a reproduction output instruction signal to the PC 10, and the PC 10 reproduces and outputs an audio signal in response to the reproduction output instruction signal. When the PC 10 is connected to the Internet and the audio signal reproduced by the PC 10 can be output to the outside via the Internet (Internet live broadcasting), the audio signal is reproduced and output to the Internet by the user operating on the immediate output switch 22 in a state where the on-air switch 26 is set to an ON state. To the three switches of the immediate output switch 22; that is, the "immediate output 1" switch, the "immediate output 2" switch, and the "immediate output 3" switch, desired audio files may be assigned in advance, and the user can control the PC 10 to reproduce and output the audio file which is assigned in advance by operating one of the three immediate output switches, the "immediate output 1" switch, the "immediate output 2" switch, and the "immediate output 3" switch. The assignment of the audio file to the immediate output switch 22 will be described later in detail.

The effect switch 24 is a switch for adding a predetermined sound effect to the audio signal. The predetermined sound effect may be arbitrary, and the process may be, for example, a process to add a reverb (reverberation sound).

The on-air switch 26 is a switch for instructing the PC 10 to output in real time via the Internet. By the user operating the on-air switch 26 to the ON state, for example, the audio signal which is input from the microphone input terminal 16 can be output to the Internet from the PC 10, or by the user operating the "immediate output 1" switch, the audio file assigned in advance to the "immediate output 1" switch may be reproduced and output to the Internet.

Figure 2:
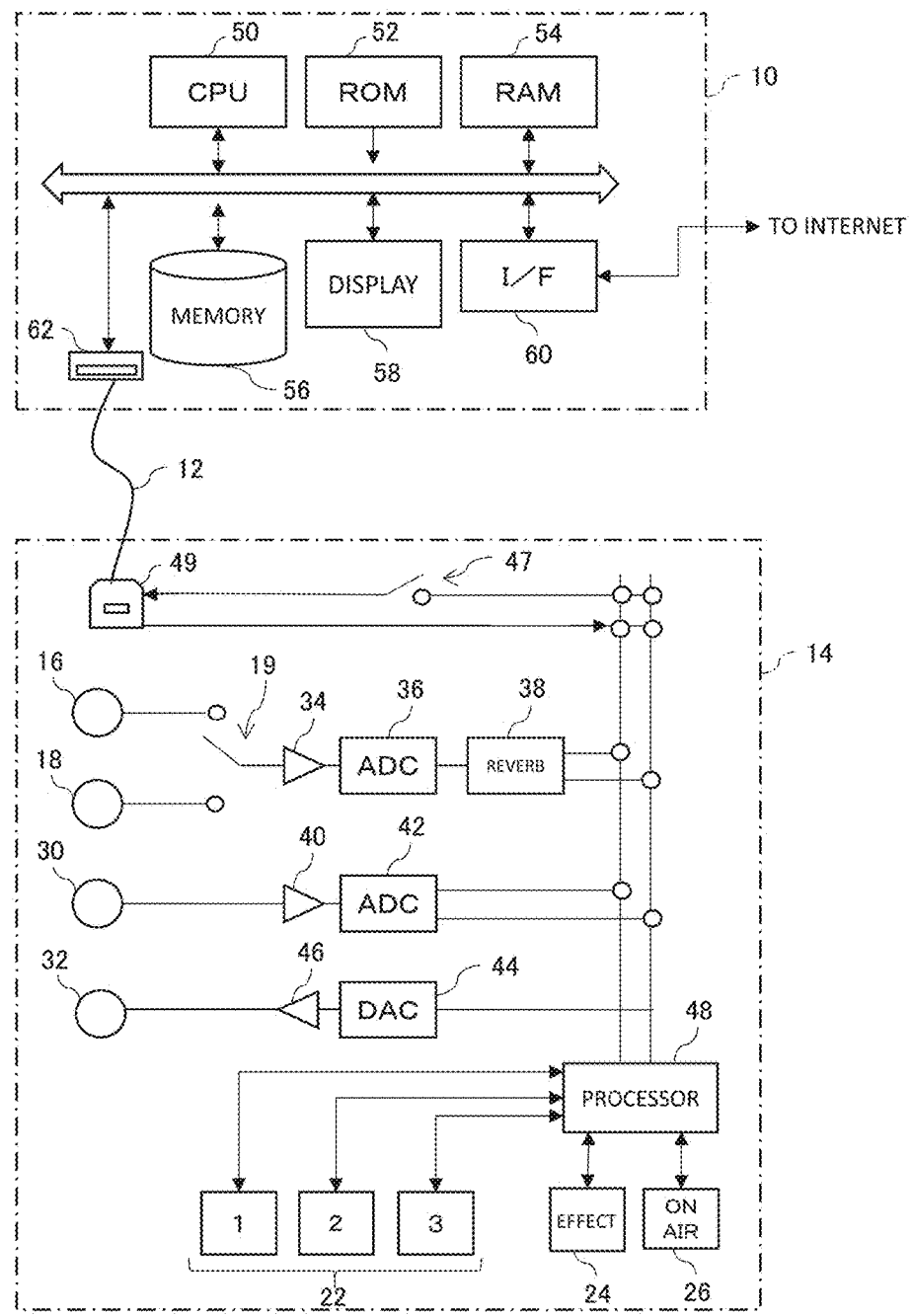
FIG. 2 is a structural block diagram of the embodiment of the present disclosure.

FIG. 2 is a structural block diagram of an audio system according to the present embodiment.

The PC 10 includes a CPU 50, a ROM 52, a RAM 54, a memory 56, a display 58, a communication interface I/F 60, and a USB connector 62. In addition, the PC 10 comprises a known input/output interface such as a mouse and a keyboard.

The CPU 50 realizes various functions of the present embodiment by reading a processing program stored in the ROM 52 or a hard disk drive or the like, and executing the processing program using the RAM 54 as a working memory.

The memory 56 stores the audio file and other files. A format of the audio file is arbitrary, and may be, for example, WAV or MP3. The other files are also arbitrary, and may be document data, image data, or video data.

The display 58 displays various information based on a control instruction from the CPU 50. In the present embodiment, in order to cooperate with the audio interface apparatus 14, the display 58 displays virtual switches corresponding to the switches of the audio interface apparatus 14;

more specifically, the immediate output switch 22, the effect switch 24, and the on-air switch 26.

The communication I/F 60 is an interface for connecting to the Internet serving as the communication line. The connection to the Internet may be either wired or wireless.

The USB connector 62 is a connector for USB-connecting with the audio interface apparatus 14. In the drawings, a connection with a USB connector 49 on the side of the audio interface apparatus 14 via the USB cable 12 is schematically shown.

The CPU 50 functions as a first controller of the system, and assigns in advance audio files desired by the user to the three switches of the immediate output switch 22, in response to the user operation. Specifically, the CPU 50 associates, in response to the user operation, one of the files stored in the memory 56 and one of the switches of the immediate output switch 22. For example, an audio file of "AAA.WAV" stored in the memory 56 is associated with the "immediate output 1" switch, and an audio file of "BBB.WAV" is associated with the "immediate output 2" switch. The description of "association" specifically means registration of a path of the audio file with the "immediate output 1" switch. The user causes the display 58 to display, for example, a list of files stored in the memory 56, and can assign (associate) the file and the switch by dropping, with a drag-and-drop operation or the like, a desired audio file icon to a virtual switch corresponding to the immediate output switch 22. The CPU 50 judges, in the assignment by the user operation, whether or not the audio file assigned to the immediate output switch 22 is normally assigned.

Here, the description of "normally assigned" means that the audio file is an audio file of a format that can be reproduced by the PC 10 and that there is no data damage or the like and the audio file can be actually reproduced. In addition, the description of "abnormally assigned" (or not normally assigned) means that the audio file is an audio file of a format that cannot be reproduced by the PC 10 or that, although the audio file is in the format that can be reproduced by the PC 10, there is data damage or the like and the audio file cannot actually be reproduced.

The CPU 50 judges whether or not the audio file is normally assigned when the file is assigned to the immediate output switch 22 by the user operation, and displays a judgment result as an assignment state on the display 58, to notify the user. The assignment state includes at least the judgment result of normal/abnormal, and when the state is normal, the assigned file name may be included.

The CPU 50 further supplies the data indicating the assignment state to the audio interface apparatus 14 which is USB-connected. With such a configuration, the assignment state is shared between the PC 10 and the audio interface apparatus 14.

The audio interface apparatus 14 comprises, in addition to the microphone input terminal 16, the built-in microphone 18, the immediate output switch 22, the effect switch 24, and the on-air switch 26 described above, an external input terminal 30, an output terminal 32, switching switches 19 and 47, amplifiers 34, 40, and 46, analog-to-digital converters (ADC) 36 and 42, a digital-to-analog converter (DAC) 44, a reverb adder (REVERB) 38, and a processor 48.

An audio signal which is input from the microphone input terminal 16 or the built-in microphone 18 is selectively switched by the switching switch 19, supplied via the amplifier 34, and converted into a digital audio signal by the ADC 36. To the digital audio signal, reverb is suitably added by the reverb adder 38 according to an operation of the effect switch 24 by the user, and the resulting digital audio signal is output to a stereo bus. In addition, an audio signal which is input from the external input terminal (AUX IN) 30 is supplied via the amplifier 40, converted into a digital audio signal by the ADC 42, and output to the stereo bus.

The audio signal which is input from the microphone input terminal 16, the built-in microphone 18, or the external input terminal 30, or the audio signal which is supplied from the PC 10 is supplied via the stereo bus, converted into an analog audio signal by the DAC 44, and output from the output terminal 32 such as the headphone terminal via the amplifier 46. A gain of the amplifier 46 is adjusted by the headphone output adjustment button 28.

The USB connector 49 for connection with the PC 10 is connected to the stereo bus via the switching switch 47. The switching switch 47 is linked with the on-air switch 26. When the on-air switch 26 is operated ON, a connection point is set to the ON state, and the output of the audio signal from the audio interface apparatus 14 to the PC 10 is started. On the other hand, regardless of the operation of the on-air switch 26, the control signal from the PC 10 to the audio interface apparatus 14 is supplied to the processor 48.

The processor 48 functions as a second controller of the system, and controls operations of various parts of the audio interface apparatus 14. The processor 48 controls the operation according to operation signals from the immediate output switch 22, the effect switch 24, and the on-air switch 26. Specifically, the processor 48 outputs the reproduction instruction signal to the PC 10 in response to the operation signal from the immediate output switch 22. When the "immediate output 1" switch of the immediate output switch 22 is operated, the reproduction instruction signal for "immediate output 1" is output; when the "immediate output 2" switch is operated, the reproduction instruction signal for "immediate output 2" is output; and when the "immediate output 3" switch is operated, the reproduction instruction signal for "immediate output 3" is output. The CPU 50 of the PC 10, upon receiving the reproduction instruction signal, reproduces and outputs an audio file assigned to the "immediate output 1" switch, the "immediate output 2" switch, or the "immediate output 3" switch in advance. In addition, the CPU 50 operates the reverb adder 38 in response to the operation signal from the effect switch 24, to add the reverb. Moreover, in response to the operation signal from the on-air switch 26, the CPU 50 outputs to the PC 10 a signal output start (broadcast start) instruction signal or a signal output stop (broadcast stop) instruction signal, and controls switching ON/OFF of the switching switch 47.

The processor 48 receives data indicating the judgment result of the assignment supplied from the PC 10 via the USB cable 12, the USB connector 49, and the bus, and controls a display form of the immediate output switch 22 based on the data indicating the judgment result of assignment. The display form includes existence/absence of the assignment of the audio file, and, if an audio file is assigned, judgment result of normal/abnormal. For example, the PC 10 judges whether or not the assignment by the user operation is normal, and, if the states are such that an audio file is normally assigned for the "immediate output 1" switch, an audio file is abnormally assigned for the "immediate output 2" switch, and no audio file is assigned for the "immediate output 3" switch, these pieces of information are supplied from the PC 10 to the processor 48 as data indicating the assignment state. Based on these pieces of information, the processor 48 lights the "immediate output 1" switch, causes the "immediate output 2" switch to blink, and does not light the "immediate output 3" switch.

The user can reproduce a desired audio file and output the audio file to the Internet by operating the immediate output switch 22 of the audio interface apparatus 14. During this process, the user can visually check the display form of the immediate output switch, to easily check whether or not an audio file is assigned to each switch of the immediate output switch, and whether or not the assignment is normal.

<Assignment of Audio File>

Figure 3:
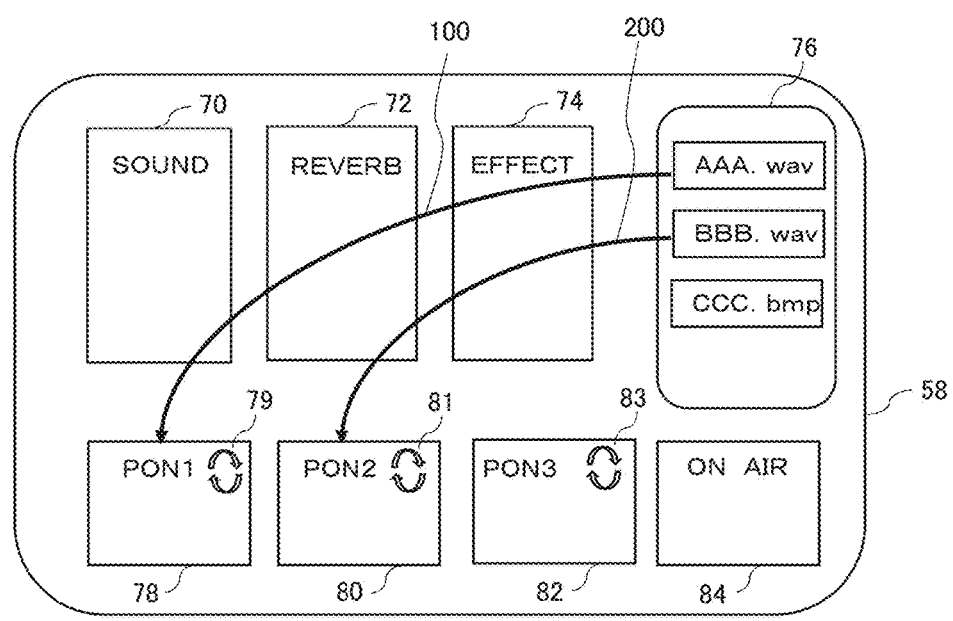
FIG. 3 is an explanatory diagram of au audio file assignment according to the embodiment of the present disclosure.

FIG. 3 is a schematic diagram showing a process when the user assigns a desired audio file to the immediate output switch 22 on the PC 10.

The CPU 50 of the PC 10 executes a processing program to display a screen shown on FIG. 3 on the display 58. Virtual switches 78, 80, and 82 corresponding to the three switches of the physical immediate output switch 22 of the audio interface apparatus 14, the "immediate output 1" switch, the "immediate output 2" switch, and the "immediate output 3" switch, respectively, are displayed on the screen, and a virtual switch 84 corresponding to the physical on-air switch 26 of the audio interface apparatus 14 is also displayed on the screen. Icons 79, 81, and 83 at the top right of the virtual switches 78, 80, and 82, respectively, are icons for instructing repeated reproduction (repeat) of the assigned audio file. In addition, display units 70, 72, and 74 for displaying the sound volume (weak talk, strong talk, weak singing, strong singing, etc.), the reverb, and the effects (other than reverb) are displayed. Further, a list 76 of various files stored in the memory 56 is displayed. The file list 76 may be a list displayed on Windows Explorer (registered trademark).

The user selects, among the group of files displayed in the file list 76, a file to be assigned to the immediate output switch 22, and executes the drag-and-drop operation to assign the file to one of the virtual switches 78~82. Alternatively, a configuration may be employed in which, by pressing the virtual switches 78~82, a file selection screen (such as a tree screen similar to the file list 76 and Windows Explorer) is displayed.

For example, when the audio file "AAA.wav" is to be assigned to the "immediate output 1" switch, the audio file "AAA.wav" is dragged and dropped to the virtual switch 78 corresponding to the "immediate output 1" switch. In the figure, an arrow 100 shows the drag-and-drop operation of the audio file "AAA.wav" to the virtual switch 78. Similarly, when the audio file "BBB.wav" is to be assigned to the "immediate output 2" switch, the audio file "BBB.wav" is dragged and dropped to the virtual switch 80 corresponding to the "immediate output 2" switch. In the figure, an arrow 200 shows the drag-and-drop operation of the audio file "BBB.wav" to the virtual switch 80.

When a file is assigned by the drag-and-drop operation in this manner, the CPU 50 judges whether or not the assignment is normal, and displays the result of the judgment on the display 58.

<Display on PC 10>

Figure 4:
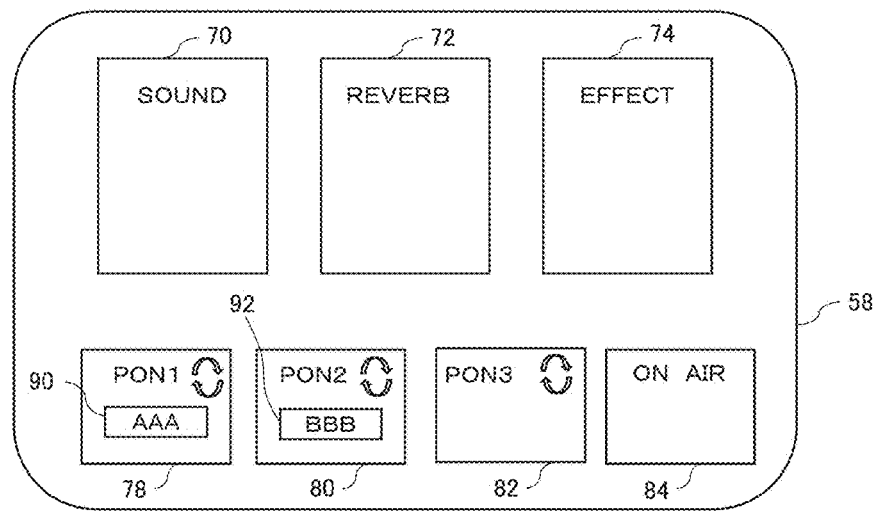
FIG. 4 is an explanatory diagram of a display of a computer for normal assignment according to the embodiment of the present disclosure.

FIG. 4 shows an example display form of the display 58 when the assignment is normal. A name 90 of the audio file assigned, "AAA", is displayed on the virtual switch 78, and a name 92 of the audio file assigned, "BBB", is displayed on the virtual switch 80. The virtual switches 78 and 80 may be displayed with a color different from an ordinary color (for example, the color may be blue whereas the color in the ordinary case is white), or may be displayed with an increased brightness. The virtual switch 82 to which no audio file is assigned is displayed with the ordinary color and the ordinary brightness.

Figure 5:
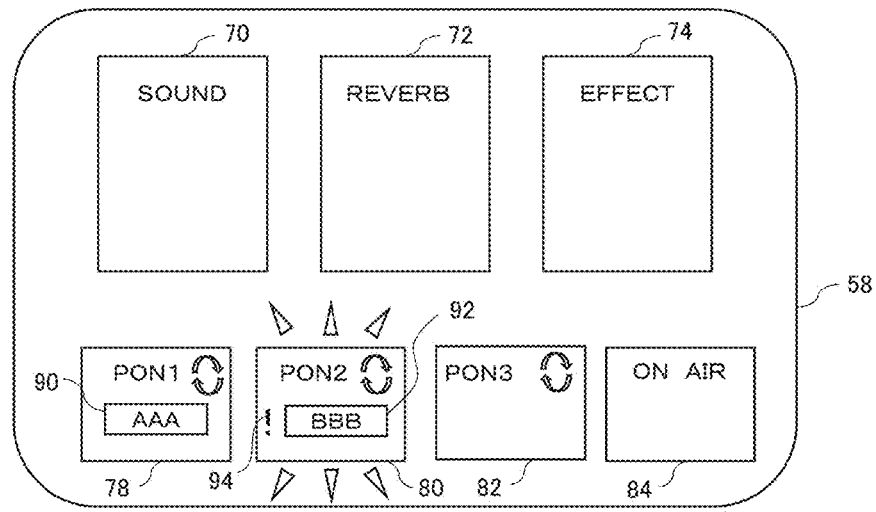
FIG. 5 is an explanatory diagram of a display of a computer for abnormal assignment according to the embodiment of the present disclosure.

FIG. 5 shows an example display form of the display 58 when the assignment is abnormal. When the extension of the audio file "BBB.wav" is rewritten and the file is not in principle an audio file, or when the file is an audio file but is not actually reproducible, the CPU 50 displays the virtual switch 80 with a color different from the ordinary color (for example, in red whereas the file in the ordinary case is displayed with blue). In addition, in order to call the user's attention, the virtual switch 80 may be displayed in a blinking manner, or a "!" symbol 94 may be displayed. The user can visually check such a display to see, before actually operating the immediate output switch 22, that while the audio file "AAA" is normally assigned to the "immediate output 1" switch, there is an abnormality in the assignment of the "immediate output 2" switch and immediate output is not possible, and that no audio file is assigned to the "immediate output 3" switch.

The CPU 50 displays the judgment result of the normality/abnormality of the assignment on the display 58, and also supplies the judgment result to the processor 48 of the audio interface apparatus 14, to share the judgment result between the PC 10 and the audio interface apparatus 14. The immediate output of the assigned audio file is ordinarily executed by the user operating the immediate output switch 22 of the audio interface apparatus 14, but alternatively, the immediate output may be realized by the user clicking on the virtual switches 78, 80, and 82 on the PC 10 with a mouse, or the like.

<Display on Audio Interface Apparatus 14>

Figure 6:
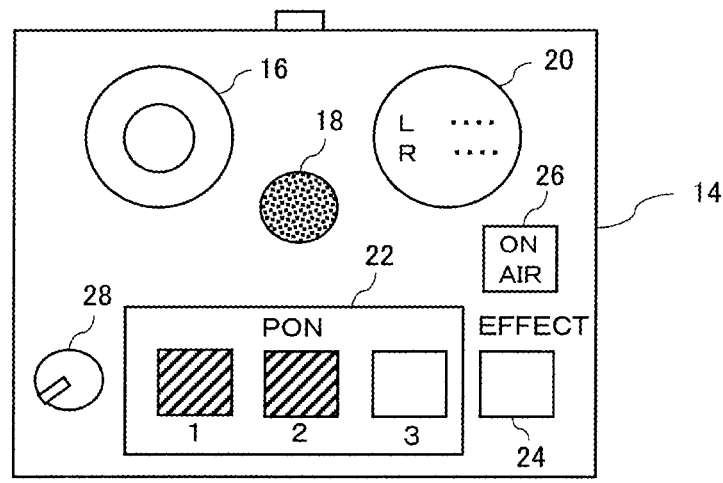
FIG. 6 is an explanatory diagram of an audio interface apparatus for normal assignment according to the embodiment of the present disclosure.

FIG. 6 shows an example display form of the immediate output switch 22 of the audio interface apparatus 14 when the assignment is normal. The "immediate output 1" switch and the "immediate output 2" switch are lighted, and the "immediate output 3" switch to which no file is assigned remains unlit. Alternatively, the "immediate output 1" switch and the "immediate output 2" switch may be displayed with a color different from ordinary, for example, in blue.

Figure 7:
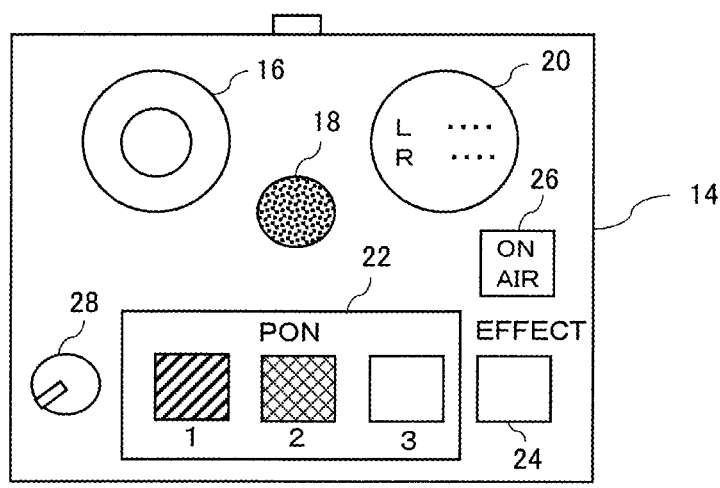
FIG. 7 is an explanatory diagram of an audio interface apparatus for abnormal assignment according to the embodiment of the present disclosure.

FIG. 7 shows an example display form of the immediate output switch 22 of the audio interface apparatus 14 when the assignment is abnormal. When the extension of the audio file "BBB.wav" is rewritten and the file is in principle not an audio file, or when the file is an audio file but is not actually reproducible, the "immediate output 2" switch is lighted with a color different from the color of the ordinary case, for example, in red. Alternatively, the "immediate output 2" switch may be displayed in a blinking manner. The user can visually check such a display to see in advance before actually operating the immediate output switch 22 that, while an audio file is normally assigned to the "immediate output 1" switch, the assignment of the "immediate output 2" switch is abnormal, and the immediate output cannot be executed, and that no audio file is assigned to the "immediate output 3" switch.

FIGS. 4~7 exemplify display forms for normal and abnormal cases at the PC 10 and the audio interface apparatus 14. Alternatively, other arbitrary display forms are possible, so long as the states are displayed in a form to allow identification of three states including a normal assignment state, an abnormal assignment state, and no assignment state.

<Process Flowchart>

Figure 8:
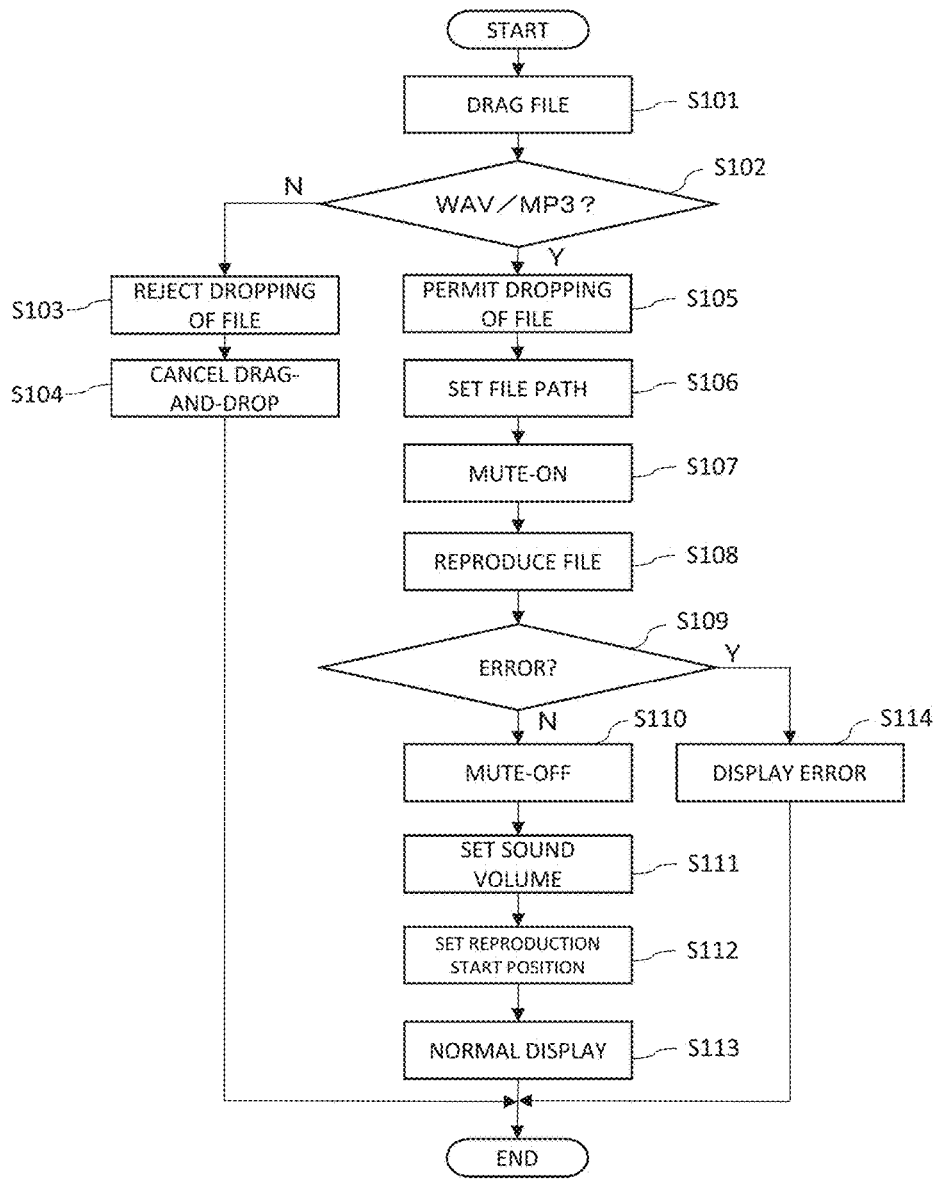
FIG. 8 is a process flowchart of the embodiment of the present disclosure.

FIG. 8 shows a process flowchart during assignment of the audio file in the present embodiment.

The user first operates the PC 10 to cause the CPU 50 to display the screen as shown in FIG. 3 on the display 58. That is, the CPU 50 displays the virtual switches 78, 80, and 82 corresponding to the immediate output switch 22 at a predetermined position on the display 58. The CPU 50 also displays the list 76 of files stored in the memory 56, in response to a user operation. In this state, the user selects a desired file from the file list 76, and drags and drops the file to a desired virtual switch 78, 80, or 82 (S101). For example, the user may drag and drop the "BBB.wav" file to the virtual switch 80 corresponding to the "immediate output 2" switch.

The CPU 50 first judges whether or not a file format of the dragged-and-dropped file is a format compatible with a predetermined music reproduction software (S102). For example, when the music reproduction software is compatible with WAV or MP3, the CPU 50 judges whether or not the file format is either of these formats. The judgment of the file format is desirably executed simply by judging whether or not the extension of the audio file is compatible with WAV or MP3. When the file format of the dragged-and-dropped file is other than WAV or MP3 (for example, when "CCC.bmp" is dragged and dropped) (NO in S102), the CPU 50 rejects dropping of the file (S103), and cancels the drag-and-drop operation (S104). In this case, the assignment to the immediate output switch 22 is not executed. In this process, the CPU 50 may display an error message on the display 58 such as "wrong file format," to notify the user. Alternatively, the CPU 50 may set the display state of the virtual switch 80 for which dropping of the file is rejected to the abnormal display for a predetermined period (period to allow the user to recognize).

When the file format of the dragged-and-dropped file conforms with the format of the music reproduction software (YES in S102), the CPU 50 permits dropping of the file (S105), and sets a file path for associating the dropped file and the immediate output switch 22 corresponding to the virtual switch (S106). For example, when "BBB.wav" is dropped to the virtual switch 80, the CPU 50 sets a file path for reading "BBB.wav" to the "immediate output 2" switch corresponding to the virtual switch 80.

Next, the CPU 50 judges whether or not the associated audio file can be actually reproduced. Specifically, the CPU 50 sets a sound device of the PC 10 to a mute-ON state (S107), and reproduces the audio files assigned to the virtual switches 78, 80, and 82 (S108). This reproduction does not need to be executed at a standard rate, and may be executed at a rate of double speed or greater. The CPU 50 judges whether or not an error is caused during the reproduction (S109).

When no error is caused during reproduction, the CPU 50 sets the mute of the sound device of the PC 10 to an OFF state (S110), sets the sound volume (S111), sets a reproduction start position (S112), and displays the virtual switches 78, 80, and 82 in the normal state (S113).

On the other hand, when an error is caused during the reproduction, the CPU 50 displays the abnormal state for the virtual switch, among the virtual switches 78, 80, and 82, for which abnormality is found (S114). The CPU 50 displays the judgment result and also supplies the judgment result to the audio interface apparatus 14. Thus, in the audio interface apparatus 14, the normal display or the abnormal display of the immediate output switch 22 is executed corresponding to the normal display of S113 or abnormal display of S114.

It takes a certain period of time from the start of reproduction in S108 to the judgment of whether or not an error is caused in S109. During this period, a normal display may be displayed assuming that the file is normally assigned, or a third display form different from normal/abnormal may be employed; that is, it is also possible to display that the state is currently being judged.

In the present embodiment, an audio file is assigned to the immediate output switch 22, but alternatively, an audio file may be assigned also to the on-air switch 26. The user may assign an audio file to the on-air switch 26 by dragging and dropping a desired audio file to the virtual switch 84 corresponding to the on-air switch 26, similar to the assignment of audio files to the "immediate output 1" switch, the "immediate output 2" switch, and the "immediate output 3" switch by dragging and dropping audio files to the virtual switches 78, 80, and 82 in FIG. 3. In this case also, the CPU 50 judges whether or not the assignment is normal, displays the judgment result on the display 58 and supplies the judgment result to the audio interface apparatus 14, and the processor 48 notifies the judgment result to the user by changing the display form of the on-air switch 26. Similar to the assignment for the immediate output switch 22, the judgment result is one of the three states of normal, abnormal, and no assignment. When the assignment is normal, the CPU 50 of the PC 10 reproduces the assigned audio file in response to an OFF-operation of the on-air switch 26, and sends a predetermined sound to the Internet. Specifically, when the user OFF-operates the on-air switch 26, the switching switch 47 is switched OFF accordingly, and in this process, the processor 48 outputs a reproduction start instruction signal for a particular sound to the PC 10. The CPU 50 reproduces and outputs the audio file which is assigned in advance, in response to the reproduction start instruction signal. The predetermined sound is, for example, sound such as "currently, there is no broadcast on-air." When the audio file is assigned to the on-air switch 26, the processor 48 may set the display color of the on-air switch 26 to a particular color.

In addition, in the present embodiment, the CPU 50 may store, in the ROM 52 or the memory 56, the past audio files assigned to the "immediate output 1" switch, the "immediate output 2" switch, and the "immediate output 3" switch; that is, history information of the assignment, and may suitably display the history information on the display 58 in response to a user operation. Specifically, when the user moves a cursor of the mouse over the virtual switch 78, the assignment history of the virtual switch 78; that is, the "immediate output 1" switch, is displayed. The user can visually check the history displayed in a pull-down menu form, and select a particular audio file in the history, so that the user can newly assign the audio file in this manner in place of the drag-and-drop operation. When the CPU 50 stores the history information for each immediate output switch, desirably, the CPU 50 stores only the audio file whose assignment was judged by the CPU 50 as normal. For example, when the audio files assigned in the past and the judgment result thereof are as follows, with o representing normal and x representing abnormal:

"aaa.mp3"→o;
"bbb.mp3"→x;
"ccc.wav"→o, the history is stored with "bbb.mp3" being deleted from the history information. Alternatively, the CPU 50 may display a particular display for the file judged as having abnormal assignment, to call attention of the user. The history information may be a common display in place of the display for each virtual switch (immediate output switch), or may be in a form that the individual display and the common display can be switched by setting.

Moreover, in the present embodiment, the judgment result of assignment at the PC 10 is shared between the PC 10 and the audio interface apparatus 14, but alternatively, the result may be shared with the audio interface apparatus 14 only when the PC 10 judges that the assignment is normal. In this case, the processor 48 of the audio interface apparatus 14 displays, in an identifiable manner, two states of "normal" and "no assignment." Here, "abnormal" can be considered to be included in "no assignment."

Further, in the present embodiment, the PC 10 and the audio interface apparatus 14 are USB-connected by the USB cable 12, but the connection form is not limited to this, and may be wired or wireless. Thus, the PC 10 and the audio interface apparatus 14 may be connected via Wi-Fi (registered trademark), Bluetooth (registered trademark), or the like. The signals transmitted and received between the PC 10 and the audio interface apparatus 14 include: the judgment result signal of assignment, the immediate output signal (reproduction start instruction signal), the audio signal, and the on-air signal (broadcast start and stop instruction signals), and any arbitrary connection form that allows transmission and reception of these signals may be employed.

The process of the process flowchart shown in FIG. 8 is realized by the CPU 50 reading and executing a processing program stored in a program memory such as the ROM 52 or the hard disk drive, as already described. Alternatively, the processing program may be stored in the program memory in advance, or may be downloaded from an external program server via the Internet or the like. In one form, the program may be downloaded as a program attached to the audio interface apparatus 14, from an external server by designating a predetermined URL. Alternatively, the processing program may be stored in a transportable storage medium such as a CD or a DVD. The processing program causes the CPU 50 to execute the following processes:

- display, on the display 58, the virtual switches 78, 80, and 82 corresponding to the "immediate output 1" switch, the "immediate output 2" switch, and the "immediate output 3" switch of the immediate output switch 22;
- display the file list 76 on the display 58 in response to the user operation, desirably, at a position different from the virtual switches 78, 80, and 82;
- detect the drag-and-drop operation of the audio file by the user;
- judge whether or not the assignment is normal, assuming that the audio file is assigned to the virtual switch when the drag-and-drop operation is detected;
- display the judgment result in association with the virtual switch; and
- output the judgment result to the audio interface apparatus 14.

<Second Embodiment>

In the first embodiment, assignment of the audio file is described. Similarly, the present disclosure may be applied to a case where a video file (a video image file) is assigned to a virtual switch corresponding to a physical immediate output switch provided on the interface apparatus, or to a switch displayed on the display 58 of the PC 10 without necessarily being correlated to the physical switch on the interface apparatus.

Figure 9:
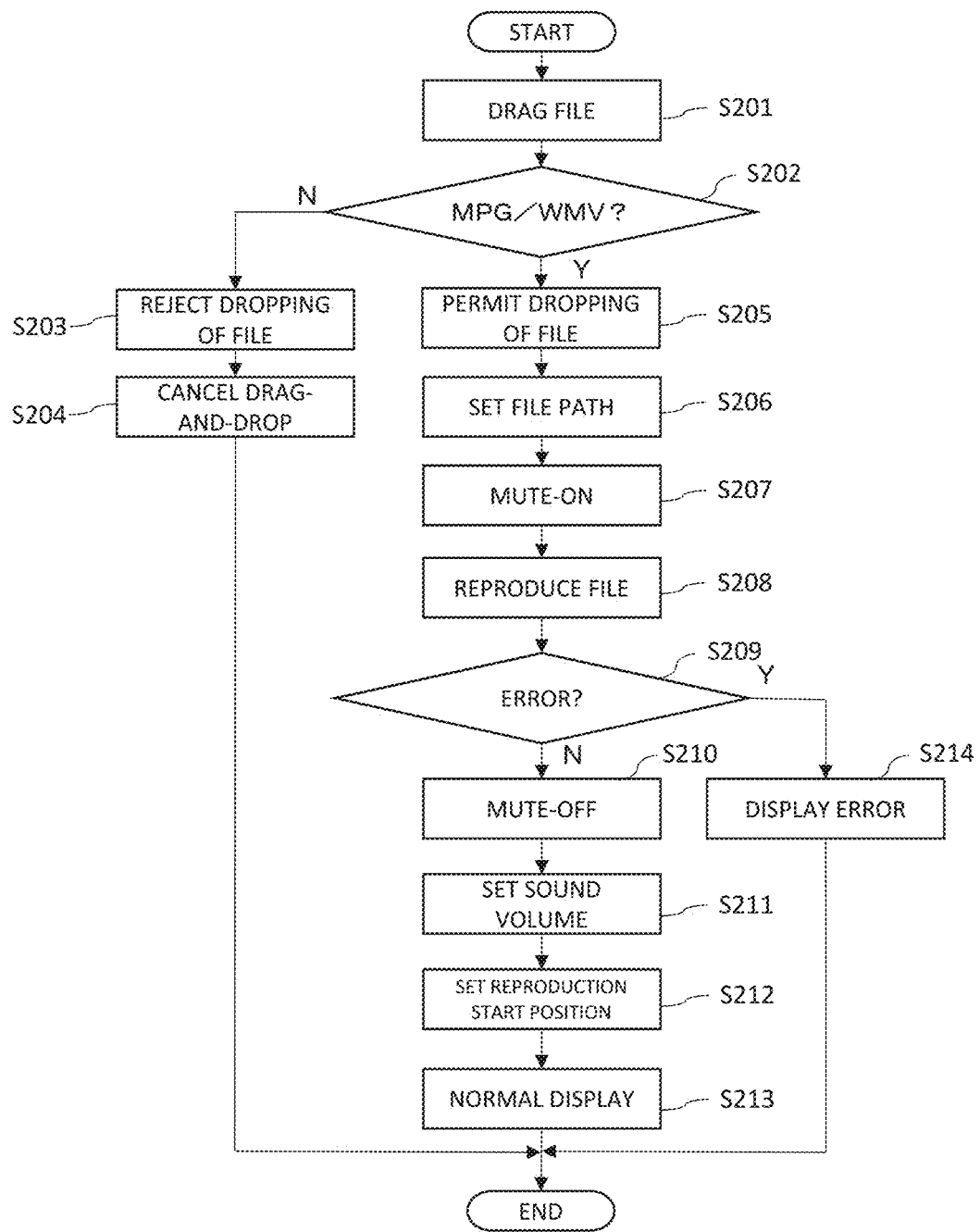
FIG. 9 is a process flowchart of another embodiment of the present disclosure.

FIG. 9 is a process flowchart when a video file is assigned in the present embodiment.

The user first operates the PC 10 to cause the CPU 50 to display the screen as shown in FIG. 3 on the display 58. That is, the CPU 50 displays the virtual switch corresponding to the immediate output switch for video image at a predetermined position on the display 58, and displays the list 76 of files stored in the memory 56, in response to a user operation. Here, the file list 76 also includes video files. In this state, the user selects a desired file from the file list 76, and drags and drops the file to a desired virtual switch (S201).

The CPU 50 first judges whether or not a file format of the drag-and-dropped file is a format compatible with a predetermined video reproduction software (S202). For example, when the video reproduction software is compatible with MPG or WMV, the CPU 50 judges whether or not the file format is either of these formats. The judgment of the file format is desirably executed simply by judging whether or not the extension of the video file is compatible with MPG or WMV. When the file format of the dragged-and-dropped file is other than MPG or WMV (for example, when "CCC.bmp" is dragged and dropped) (NO in S202), the CPU 50 rejects dropping of the file (S203), and cancels the drag-and-drop operation (S204). In this process, the CPU 50 may display an error message on the display 58 such as "wrong file format," to notify the user. Alternatively, the CPU 50 may set the display state of the virtual switch for which dropping of the file is rejected to the abnormal display for a predetermined period (period to allow the user to recognize).

When the file format of the dragged-and-dropped file conforms with the format of the video reproduction software (YES in S202), the CPU 50 permits dropping of the file (S205), and sets a file path for associating the dropped file and the virtual switch (S206). For example, when "DDD.mpg" is dropped to the virtual switch, the CPU 50 sets a file path for reading "DDD.mpg" to the virtual switch.

Next, the CPU 50 judges whether or not the associated video file can be actually reproduced. Specifically, the CPU 50 sets a sound device of the PC 10 to a mute-ON state (S207), and reproduces the video file assigned to the virtual switch (S208). During the reproduction, the video image does not need to be displayed on the display 58. That is, even if the video file is reproduced, it is not necessary to let the user view the video image or listen to the music. In addition, this reproduction does not need to be executed at a standard rate, and may be executed at a rate of double speed or greater. The CPU 50 judges whether or not an error is caused during the reproduction (S209).

When no error is caused during reproduction, the CPU 50 sets the mute of the sound device of the PC 10 to an OFF state (S210), sets the sound volume (S211), sets a reproduction start position (S212), and displays the virtual switch in the normal state (S213).

On the other hand, when an error is caused during the reproduction, the CPU 50 displays the abnormal state for the virtual switch, among the virtual switches, for which abnormality is found (S214).

In the present embodiment also, similar to the first embodiment, the reproduction sound is not output during reproduction for judgment of normal or abnormal, and, in the case of the video file, the video image is not displayed. Thus, the user does not notice that the reproduction for judgment of normal or abnormal is being executed by the PC 10. This means that the judgment for normality/abnormality of the assigned file is executed in the background.

<Third Embodiment>

In the first and second embodiments, configurations are described in which judgment is made as to whether or not assignment is normal when the audio file or the video file is assigned to the virtual switch. However, even if the file is judged as normal at the time of assignment, the assigned file may be damaged later due to some reason, and there may be a problem in that the file cannot be normally reproduced even when the immediate output switch 22 is operated.

In consideration of the above, in the present embodiment, in addition to the time of assignment of the file, it is checked whether or not the assigned file is normal in the background at an arbitrary timing after the assignment.

Figure 10:
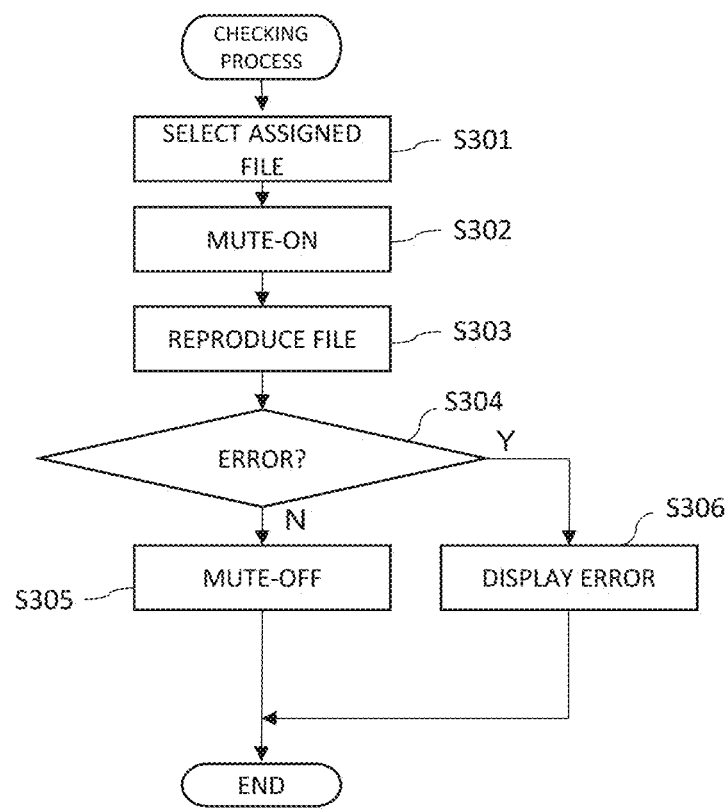
FIG. 10 is a process flowchart of yet another embodiment of the present disclosure.

FIG. 10 is a process flowchart of the checking process in the present embodiment. This process is executed at an arbitrary timing after file assignment. The arbitrary timing may be manually set by the user or may be automatically set by the CPU 50. In addition, this process is desirably repeatedly executed at a predetermined interval, including upon the startup of the software (application).

First, the CPU 50 selects a file to be checked among the assigned files assigned to the virtual switches (S301). The file to be checked may be either an audio file or a video file.

After selecting the file to be checked, the CPU 50 sets the mute of the audio device of the PC 10 ON (S302). In the case of the video file, the video image of the video reproduction software is set to non-display. The file is reproduced (S303), and the CPU 50 judges whether or not an error occurs (S304).

When there is no error, the assignment file is assumed to be maintained at normal, and the mute of the audio device is switched OFF (S305). In addition, display of the video image is enabled. On the other hand, when an error occurs, it is judged that the assignment has changed from normal to abnormal, and an error display is displayed (S306). A display form of the error display is similar to that of S114 or S214. With this process, for example, the virtual switch 78 which has been displayed in blue at the time of assignment may be changed to a blinking display after the checking process. The user can visually check the change of the display form, to see in advance prior to actually operating the immediate output switch 22, that some problem has occurred in the assigned file.

Embodiments of the present disclosure have been described. The present disclosure, however, is not limited to these embodiments, and various modifications may be made.

For example, in the embodiments, cases are exemplified in which an audio file or a video file is assigned to the virtual switch displayed on the display 58 of the PC 10 by the drag-and-drop operation, but the configuration is not limited to the virtual switch, and the present disclosure can be applied to cases where the file is to be assigned to an arbitrary switch, button, or folder displayed on the display 58. That is, the present embodiments may be applied to any case where an audio file or a video file is to be assigned to an assignment target such as a switch or a button displayed on the display 58 of the PC 10.

Further, in the present embodiments, when the assigned file is checked, the checking process is processed in the background without the user noticing the checking process by executing the checking process with no sound and no image, but alternatively, if the user desires, a message such as "currently checking assigned files" may be displayed on the display 58.

The invention claimed is:

1. An audio/video signal processing apparatus comprising:
    a display device;
    a sound device;
    a processor; and
    a memory device that stores processor-executable instructions which, when executed by the processor, cause the processor to:
    display an assignment target and a name of a file on the display device;
    in response to a user operation that assigns the file to the assignment target displayed on the display:
        set a file path that associates the file with an operation switch corresponding to the assignment target;
        set the sound device to a state in which the sound device is muted;
        reproduce the file in the background while the sound device is set to the state in which the sound device is muted, wherein the processor causes the file to be reproduced in the background with no sound when the file is an audio file and causes the file to be reproduced in the background with no sound and no image when the file is a video file;
        make a first judgement whether an error is caused while the file is reproduced in the background while the sound device is set to the state in which the sound device is muted; and
        display a result of the first judgment in association with the assignment target on the display device.

2. The audio/video signal processing apparatus according to claim 1, wherein
    after the processor has judged that an error is not caused during reproduction of the file, the processor makes a second judgment, at a predetermined timing, whether an error is caused during another reproduction of the file, wherein the processor causes the file to be reproduced again in the background with no sound when the file is the audio file and causes the file to be reproduced again in the background with no sound and no image when the file is the video file, and the processor displays, on the display device, a result of the second judgment in association with the assignment target.

3. An audio/video signal processing apparatus that connects to an audio device having an operation switch that outputs, in response to an operation of the operation switch, a reproduction start instruction signal of an audio file which is assigned to the operation switch, the apparatus comprising:
    a display device;
    a sound device;
    a processor; and
    a memory device that stores processor-executable instructions which, when executed by the processor, cause the processor to:
    display a virtual switch corresponding to the operation switch and a name of the audio file on the display device;
    in response to a user operation that assigns the audio file to the virtual switch:
        set a file path that associates the audio file with the operation switch;
        set the sound device to a state in which the sound device is muted;
        reproduce the file in the background while the sound device is set to the state in which the sound device is muted;
        make a first judgement whether an error is caused while the audio file is reproduced in the background while the sound device is set to the state in which the sound device is muted; and
        display a result of the first judgement in association with the virtual switch on the display device.

4. The audio/video signal processing apparatus according to claim 3, wherein
    after the processor has judged that an error is not caused during reproduction of the audio file, the processor makes a second judgment, at a predetermined timing, whether an error is caused during another reproduction of the audio file in the background with no sound, and displays, on the display device, a result of the second judgment in association with the assignment target.

5. A non-transitory computer-readable storage medium storing a program which, when executed, causes a computer to:
   display, on a display device, an assignment target;
   display, on the display device, a name of a file in a list;
   in response to an assignment being made by a drag-and-drop operation of the name of the file to the assignment target:
      set a file path that associates the file with an operation switch corresponding to the assignment target;
      set a sound device to a state in which the sound device is muted;
      reproduce the file in the background while the sound device is set to the state in which the sound device is muted, wherein the file is reproduced in the background with no sound when the file is an audio file and the file is reproduced in the background with no sound and no image when the file is a video file;
      make a first judgement whether an error is caused while the file is reproduced in the background while the sound device is set to the state in which the sound device is muted; and
      display, on the display device, a result of the first judgment in association with the assignment target.

6. The computer-readable storage medium according to claim 5, wherein, after the computer has judged that an error is not caused during reproduction of the audio file, the program further causes the computer to make a second judgment, at a predetermined timing, whether an error is caused during another reproduction of the file, wherein the second judgment is made by reproducing the file again in the background with no sound when the file is the audio file and reproducing the file again in the background with no sound and no image when the file is the video file, and the program further causes the computer to display, on the display device, a result of the second judgment in association with the assignment target.

* * * * *